United States Patent [19]

Kadah et al.

[11] Patent Number: 5,337,206
[45] Date of Patent: Aug. 9, 1994

[54] THREE PHASE POWER MONITOR

[75] Inventors: Andrew S. Kadah, 5000 Henneberry Rd., Manlius, N.Y. 13104; Andrew M. Nguyen, Syracuse, N.Y.

[73] Assignee: Andrew S. Kadah, Manlius, N.Y.

[21] Appl. No.: 775,540

[22] Filed: Oct. 15, 1991

[51] Int. Cl.$^5$ .......................... H02H 3/26; H02H 3/48
[52] U.S. Cl. ......................................... 361/85; 361/78; 361/29
[58] Field of Search .................. 361/20, 71, 73, 72, 361/75, 77, 59, 61, 83, 85, 88–90, 93–97, 100, 102, 111, 23, 28, 29, 30, 31, 33, 60, 86, 87, 91, 92

[56] References Cited

U.S. PATENT DOCUMENTS 4,354,214 10/1982 Walton .................................. 361/23
4,989,155 1/1991 Begin et al. ........................ 361/30

Primary Examiner—A. D. Pellinen
Assistant Examiner—Ronald W. Leja
Attorney, Agent, or Firm—Harris Beach & Wilcox

[57] ABSTRACT

A three-phase power monitor operates a contactor between a supply of three phase electrical power and a three phase load. A phase integrity detector has three inputs connected respectively to the three phases of the electrical power. If a loss, reversal, or dissymmetry is detected, a photoemitting device is actuated. Actuation can also result from low or high line frequency. A power supply circuit is input with the three phases of power and has an output providing a dc level corresponding to the voltage level of the three-phase electrical power. A hold circuit has a first time constant associated with it and attains a hold level when current is applied to its input, but reverts to a release level after this current ceases. An interrogator circuit is coupled to the power supply and to the input of the hold circuit and provides a periodic recharge current to the hold circuit at a period that is shorter than the period of the hold circuit. A high/low voltage level detector interrupts the periodic recharge current if the dc level is outside a predetermined voltage limit. A photosensor-based discharge circuit is optically coupled to the photoemitting device of the three phase integrity detector, and is electrically coupled to the hold circuit for discharging the time constant circuit thereof if a phase loss or phase imbalance is detected.

20 Claims, 7 Drawing Sheets

| FIG. 7A | FIG. 7B |

THREE PHASE POWER MONITOR

BACKGROUND OF THE INVENTION

This invention relates to a three-phase voltage protective circuit which continuously monitors the power phases of a polyphase power source and actuates a contactor to close or open and to provide power to a three-phase load when the three phases are in proper voltage and phase relation to one another, but to cut off power to the load if the integrity of any of the three phases becomes degraded.

Polyphase protective circuits, as currently available, are complex and expensive devices which rely heavily on digital controls and elaborate circuitry. These devices can cost over $600 each, and represent a sizeable expense in electrical power design for large three-phase induction motors.

Larger polyphase induction motors have a three phase contactor (which is essentially a three-pole relay) interposed between the three phase power line and the motor. The contactor is actuated to start the motor. A protective three-phase monitor is generally connected to the contactor and has probes connected to the three phases of AC power in advance of the contactor.

The phase relations of the three power phases and their voltage levels are continuously monitored. In the event of a phase reversal or a loss of power in one of the three power conductors, the protective monitor will open the contactor and de-energize the motor. If the phase angle between the three power conductors varies from 120 degrees, the monitor will signal an alarm condition and then open the contactor to shut the motor off if phase dissymmetry persists or exceeds some threshold for a specified period of time. Also, the voltage is monitored, and the contactor is held open if a high or low voltage condition occurs.

These devices sense voltage and phase condition only upstream of the contactor. If a voltage or phase condition occurs due to a contactor malfunction, the problem will not be detected and the motor will not be protected.

OBJECTS AND SUMMARY OF THE INVENTION

It is an object of this invention to provide a straightforward, reliable protective circuit which avoids the drawbacks of the prior art.

It is another object of this invention to provide a three-phase protective circuit that employs simple circuitry and does not rely on elaborate expensive digital controls.

It is a further object to provide a protective circuit that incorporates anti-short-cycle protection.

It is a still further object to provide a low-cost, reliable three-phase voltage protector which actuates a contactor only if the phase integrity of the three-phase power is sufficiently high, and only if the voltage and frequency for all legs of the three phase power are within an acceptable range.

It is a further object of this invention to provide protection on the "back side" of the contactor or other switching device guaranteeing "good power only" at the load.

According to one aspect of this invention, a three-phase power monitor operates a contactor that is interposed between a three-phase electrical power source and a three-phase load. The term "contactor" should be taken rather broadly and is intended also to include three-phase solid state relays, or phase controls in addition to frequency inversion devices known as variable speed drives. The latter can have an output frequency capability of 0–10 KHZ AC or 0–10 KHZ pulse-width-modulated DC. A three-phase integrity detector circuit has three inputs respectively connected to the three phases, or legs, of the electrical power. This circuit detects a loss, reversal, or dissymmetry as among the three phases, and actuates a photo-emitting device, e.g. an LED if a phase loss of reversal or a significant phase dissymmetry appears in one phase.

A power supply circuit has inputs coupled to the three-phase power, and an output providing a dc level that corresponds to the voltage level of the three-phase electrical power.

A hold circuit has an input terminal and an output terminal, and a first time constant circuit associated with the input terminal. The output terminal attains a "HOLD" level when current is applied to the input, but reverts to a release level at a predetermined time period after cessation of the current to the input terminal (typically two to three seconds).

An interrogator circuit is coupled to the power supply outlets and to the input of the hold circuit. The interrogator circuit is operative to apply a periodic recharge current to the input of the hold circuit. The period of this is somewhat shorter than the predetermined period of the hold circuit (typically about one second).

A high/low voltage detector circuit is coupled to the output of the power supply and has an output coupled to the interrogator circuit. This circuit interrupts the periodic recharge current if the dc level is above a predetermined high voltage or below a predetermined low voltage.

A photosensor-based discharge circuit is optically coupled to the photoemitting device of the three-phase integrity detector and is electrically coupled to the hold circuit for discharging the time constant circuit of the hold circuit. Actuation of the discharge circuit sets the hold circuit immediately to its release level. This opens the contactor and protects the electrical load device, for example, in the event of a loss of one phase.

In a preferred mode, the phase integrity detector circuit has a phase shift circuit for shifting one of the three phase currents by 120 degrees and this shifted phase and the other phases are fed, via an impedance network, to a hi-directional LED device. A loss or reversal of any of the phases will light the LED brightly. A voltage, phase, or frequency discrepancy will light the LED an amount that depends on the size of the discrepancy. This circuit can be made frequency dependent or frequency independent, as desired for a given application.

The three-phase power monitor can also favorably include an anti-short-cycle protective time-out circuit which delays energization of a load until a predetermined time period has elapsed after a previous de-energization.

In one preferred circuit, an SCR has its anode connected to a positive dc conductor and its cathode connected through a load device to a negative dc conductor. A PNP transistor has its emitter electrode coupled to the positive dc conductor and its collector electrode connected to the gate of the SCR. A filter capacitor is connected between the gate and cathode of the SCR, and a capacitive timing circuit is connected between the transistor base and the negative dc conductor. A diode can also be included between the capacitive timing circuit and the negative dc conductor. A bias resistor is favorably connected in parallel to the filter capacitor. The time constant circuit can have a delay time on the order of sixty seconds, so that if the current to the load is shut off, a time out delay of sixty seconds is imposed before the load device can be re-energized.

In an alternative anti-short cycle mechanism, a depletion-mode N-channel FET can be arranged to disable the unijunction oscillator of the interrogator circuit for a predetermined time interval.

The above and many other objects, features, and advantages of this invention will present themselves to persons skilled in the art upon reading the ensuing description of the preferred embodiments, which should be read in conjunction with the accompanying Drawing:

DETAILED DESCRIPTION OF A PREFERRED EMBODIMENT

Figure 1:
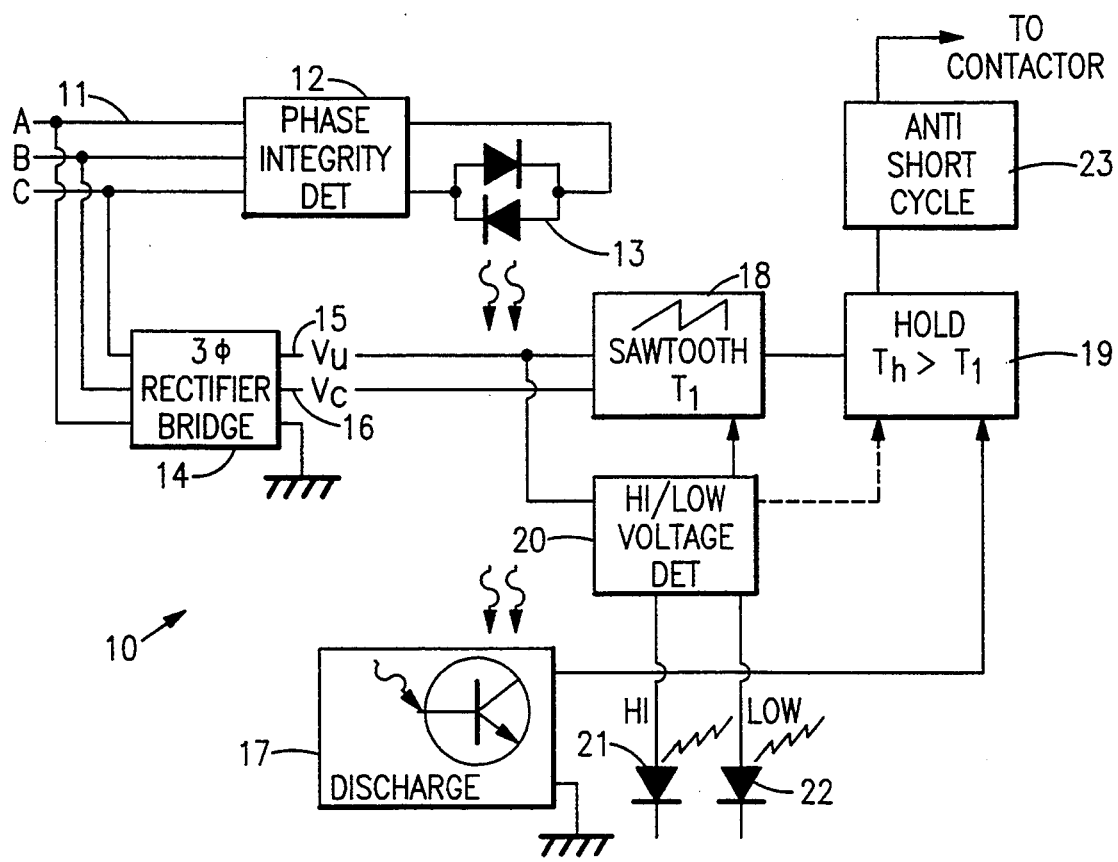
FIG. 1 is a block diagram schematic of a basic three-phase power monitor according to this invention.

With reference to the Drawing, and initially to FIG. 1, a three-phase power monitor 10 is shown in basic block diagram, coupled to a three-phase power line 11 containing three line phases $\phi A$, $\phi B$, $\phi C$. The three line phases are fed to inputs of a phase integrity detector circuit 12. This circuit 12 includes a photoemitter 13, to wit, a pair of back-to-back coupled LEDs. The photoemitter 13 is dark when the phase and line voltages are acceptable, but lights in the case of phase reversal, or loss of power in any one of the three power conductors. The photoemitter will also emit if there is a phase dissymmetry, that is, if there is a phase shifting of one of the three phases, or voltage imbalance.

The three power conductors are also coupled to a three-phase rectifier bridge circuit 14 which has an unregulated output 15 which provides an unregulated dc version $V_u$ of the input three-phase AC power. The rectifier circuit 14 also has a regulated output 16 providing regulated dc low voltage $V_c$, e.g., 24 volts. A photoconductor-controlled discharge circuit 17 is optically coupled to the photoemitter device 13 of the integrity detector circuit 12, and is arranged to conduct in response to illumination by the device 13. An interrogator circuit 18 has inputs connected to the unregulated and regulated voltage outputs 15 and 16, and an output that supplies a periodic recharge current at a predetermined time interval $T_1$, which is typically about one second. A hold circuit 19 has an input connected to the interrogator circuit 18, and the hold circuit has a hold time constant $T_h$ which is greater than the interrogator circuit time interval $T_1$, and can typically be on the order of about 2-3 seconds. A high and low voltage detector circuit 20 has an input connected to the unregulated voltage output 15 of the rectifier circuit 14, and an output connected to the interrogator circuit 18, or alternatively to the hold circuit 19. The voltage detector circuit 20 detects whether the voltage $V_u$, and, consequently, whether the ac line voltage, is above a predetermined maximum or below a predetermined minimum voltage. If a high voltage or low voltage condition is detected, the detector circuit 20 is operative to disable the interrogator circuit 18, or, alternatively to disable the hold circuit 19. If a high voltage condition is detected, the circuit 20 is operative to illuminate an LED indicator 21. If a low voltage condition is detected, the circuit 20 is operative to illuminate an indicator LED 22.

When power is applied along the conductors of the line 11, dc voltage is generated in the rectifier bridge circuit 14, and is applied through the outputs 15 and 16 to the interrogator circuit 18. The circuit 18 generates a periodic recharge current to charge the hold circuit 19 and set it to its on or hold condition. This is operative to actuate the three-phase contactor (not shown) to place the three-phase load on-line. In the event that one of the three phases $\phi_A$, $\phi_B$, $\phi_C$, is missing or has its phase reversed or unacceptably shifted out of frequency or voltage range, the photoemitter 13 will illuminate, and actuate the discharge circuit 17. This prevents the hold circuit 19 from charging up to its hold condition, and thus prevents the contactor (which could alternatively be a load-actuating solid-state relay or a frequency inverter) from actuating in the event of loss, reversal, or dissymmetry among the three phases.

If the voltage is outside a predetermined acceptable range, for example, above 220 volts or below 200 volts, the high/low voltage detector circuit 20 will be operative to disable the interrogator circuit 18 so that the hold circuit 19 will discharge to its release level, or, if not actuated, preclude the hold circuit from attaining its hold level.

Also shown between the hold circuit 19 and the contactor is an anti-short-cycle circuit 23. This circuit is operative to prevent the contactor from actuating if the load has been recently deenergized (within the past sixty seconds, for example), but will immediately actuate the contactor if the load has not been energized within that period. This delay can be anywhere from ten second to ten minutes (or even longer), as suited to a given application.

Figure 2A:
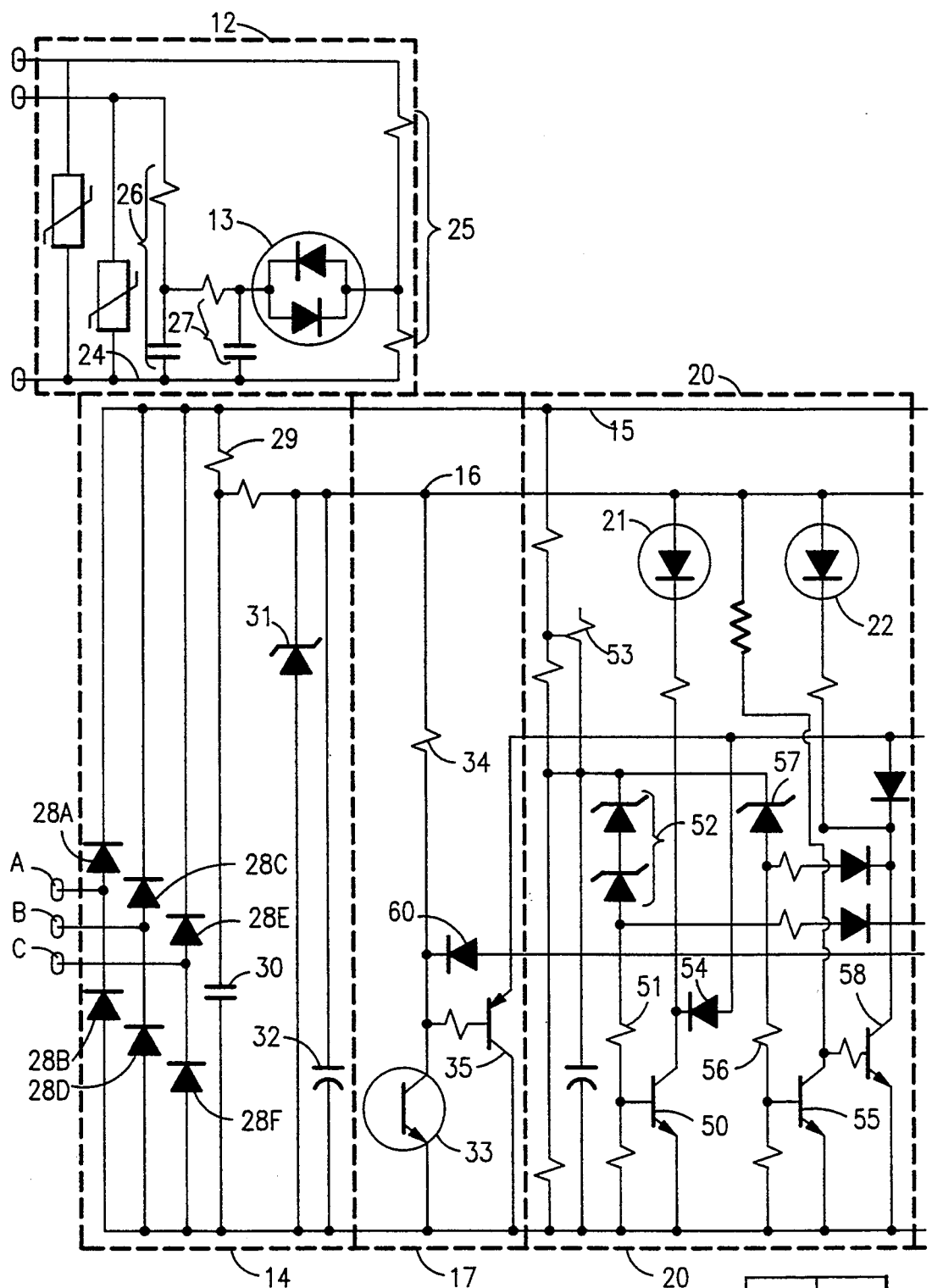
FIG. 2, formed of FIGS. 2A and 2B, is a detailed schematic diagram of the power monitor according to a preferred embodiment of this invention.
Figure 2:
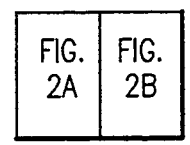

FIG. 2 illustrates the details of the circuit according to a preferred embodiment, in which the elements (enclosed within broken-line boxes) that are described above with reference to FIG. 1 are identified here with the same reference numbers.

The phase integrity detector 12 employs one phase, $\phi C$, as a reference for comparison with the other two phases $\phi A$, $\phi B$. The back-to-back LED photoemitter device 13 lights if one of the three phases, $\phi_A$, $\phi_B$, $\phi_C$, is missing, if the mutual phase separation is other than 120 degrees or if the voltages of the three phases are not the same Here, a reference line 24 receives the phase $\phi_C$ as a reference, and this is connected to one side of a resistor network 25. Phase $\phi_A$ is coupled through a first RC phase shift . network 26 and a second phase shift network 27, which each impose a phase delay of 60°, to one side of the back-to-back LED photoemitter device 13. Alternatively, a single phase network 26 or 27 may be employed with a phase shift of 120° or greater. The remaining phase $\phi_B$ is coupled through the resistive network 25 to the other side of the photoemitter device 13. This circuit is frequency dependent and is designed for a given power frequency, e.g. 60 HZ. If it is desired that this circuit be frequency-independent, an additional capacitor can be included in the resistive network 25 and the values of the other capacitors can be adjusted.

In the rectifier bridge circuit 14, three power conductors are coupled through respective inputs to six power diodes 28a to 28f, which provide at output 15 a low-ripple dc voltage that corresponds to the input ac voltage. This is typically between 200 and 240 volts dc, depending on existing line conditions. The output is applied through a resistive network 29 to a capacitor 30, and then through a resistor and a voltage-regulator zener 31 to an output smoothing capacitor 32, which provides the output line 16 with a low voltage, e.g. 24 volts dc.

The discharge circuit 17 is here shown to comprise a phototransistor 33 whose emitter is coupled to ground and whose collector is coupled through a collector resistor 34 to the low-voltage line 16, and is also coupled to the base of a PNP switching transistor 35.

The interrogator circuit 18 is here formed of a sawtooth generator based upon a programmable unijunction transistor or PUT 36. The anode of the PUT 36 is connected through a transistor 37 to the line 16, and is also connected to a junction 45 between a charging resistor 38 and timing capacitor 39 that are respectively connected to the line 16, and to ground. The gate of the PUT 36 is held at a predetermined bias level. A cutoff transistor 40 is here shown also with its base coupled to the cathode of the PUT 36 and its collector-emitter circuit coupled between the junction 45 and ground. This transistor 40 is preferred, but not strictly necessary, to cut off latching current from the PUT 36 so that it continues to generate a saw tooth charging current which appears at its cathode and is applied through a charging diode 41 to the hold circuit 19.

The hold circuit 19 has a timing capacitor 42 and discharge resistor 43 connected in parallel at the gate of a hold transistor 44. Intermittent charging current from the interrogator circuit 18, which has a period smaller than the discharge time of the timing capacitor 42 and resistor 43, turns the transistor 44 on, and the latter remains held on until the charge is removed from the capacitor 42. The source of the transistor 44 is coupled to ground, while the drain thereof is coupled through the anti-short cycle timer circuit 23 to the unregulated voltage output line 15, as well as to contactor actuators.

The voltage level detector 20 has a high voltage sensing transistor 50 whose emitter is coupled to ground and whose base is coupled through a base bias net 51, which includes an optional pair of series zeners 52. An adjustable resistance arrangement 53 is coupled between the zeners 52 and the unregulated voltage line 15. The high-voltage indicator LED 21 is connected between the regulated voltage line 16 and the collector of the transistor 50. A discharge diode 54 has its cathode connected to the collector of the transistor 50 and its anode connected to the junction 45 between the charging resistor 38 and the timing capacitor 39 of the interrogator circuit 18.

A low voltage sensor transistor 55, here arranged as an inverter, has its emitter coupled to ground and its base coupled through a biasing network 56 to a single zener 57 that is also connected to the adjustable resistance 53. Slave transistor 58 has its base coupled to the collector of the transistor 55 and its collector coupled to the junction 45 of the charging resistance 38 and the timing capacitor 39 the collector of the sensor transistor is connected to the indicator LED 22.

If the voltage $V_u$ is below a predetermined maximum voltage, e.g., 220 volts, or above a predetermined minimum voltage, e.g. 200 volts, the transistors 50 and 58 are held off and the interrogator circuit 18 is operative to continue producing the intermittent charging voltage that is fed to the hold circuit 19. However, if the voltage $V_u$ exceeds the maximum voltage, the transistor 50 comes on, and discharges the capacitor 39. The voltage $V_u$ has to be high for at least several cycles before the hold transistor 44 is shut off. Similarly, if the voltage $V_u$ is below the minimum, i.e. below 200 volts, the transistor 55 conducts and discharges the capacitor 39. If the voltage $V_u$ is low for sufficient length of time, the hold transistor 44 will become shut off.

With this arrangement, for small variations above the maximum voltage or below the minimum voltage, there is only a gradual bleed of charge from the capacitor 39, and a higher or lower condition must remain for several seconds before the hold circuit 19 reverts to its release level. However, for large discrepancies above the maximum or minimum, the capacitor 39 discharges quickly and interrupts the periodic recharge current so that the hold circuit 19 reverts to its release level quickly, i.e., within the time constant determined by the capacitor 42 and resistor 43. If desired, the circuit could be designed to discharge the hold circuit 19 quickly.

With this system, if there is a high or low voltage intermittently imposed on the line current, i.e., a spike that occurs for one line cycle, the high or low voltage detector 20 will not interrupt power to the load. However, for a sustained high or low voltage condition, the high and low voltage detector circuit 20 will interrupt the power to the load to protect the same. A discharge diode 60 is shown here with an anode connected to the capacitor 42 and to the gate of the transistor 44, and with its cathode connected to the collector of the phototransistor 33. As mentioned previously, the phototransistor 33 is optically coupled the photoemitters 13 of the phase integrity detector circuit 12. An additional phase integrity detector circuit 12' e.g. for backside protection, can have its photoemitter also optically coupled to the photoemitter 33, or to a similar device parallel thereto. This can be by a fiber-optic connection, or else the photodiodes of the photoemitter 13 and the phototransistor 33 can be incorporated into a single package. If there is a phase loss of one phase, i.e., $\phi A$, $\phi B$, or $\phi C$, the photoemitter 13 lights brightly, and turns the phototransistor 33 on hard. This immediately discharges the capacitor 42 and shuts off the hold transistor 44. This in turn actuates the contactor off. On the other hand, if there is a moderate phase discrepancy, for example, if the voltage on one line phase is slightly high or low or if there is a phase angle between the line phases slightly greater than or less than 120°, the photoemitter 13 will illuminate more softly. This small amount of light turns the transistor 33 on moderately i.e, within its active region. If the phase discrepancy persists for some period of time, i.e., for several seconds, the capacitor 42 will become completely discharged and the transistor 44 will be shut off. However, if the condition rights itself within a few line cycles, the power to the transistor 44 will not be shut off and power to the load will not be interrupted.

The automatic anti-short-cycle timer circuit 23 has a silicon controlled rectifier or SCR 70 whose anode is coupled through a resistor 71 to the voltage output line 15. A zener diode 72 defines a regulated voltage and is connected between the anode of the SCR 70 and ground. A filter capacitor 73 and resistor 74 are connected in parallel between the gate and the cathode of the SCR 70 while a load resistor 75 is connected between the cathode of the SCR 70 and an output device, to be described below.

A zener 76 is connected between the anode of the SCR 70 and the emitter of a transistor device 77, here shown as a PNP darlington pair, whose collector is coupled to the gate of the SCR and whose base is connected to a timing circuit 78 that is also connected to the drain of the hold transistor 44. The timing circuit 78 comprises a timing capacitor 79 and timing resistor 80 connected in parallel, the circuit 78 defining a time constant which is about sixty seconds in this embodiment.

In operation, the SCR 70 will turn on when the transistor 44 is energized, unless there is a potential existing on the capacitor 79. However, once this potential has decayed, i.e., after the time constant of sixty seconds, the SCR will then turn on. The collector of the transistor device 77, which is coupled to the gate of the SCR 70 keeps the SCR held off until the capacitor 79 is discharged. Thus, if there is a high or low voltage or a phase problem detected in the power, and this problem is sufficient to shut off the hold transistor 44, the circuit 23 prevents a subsequent stage from being reenergized until the predetermined time, e.g., sixty seconds, has elapsed. This protects the electrical load from damage that might be caused from intermittent actuation.

In this embodiment, the output resistor 75 is coupled to the base of a relay control transistor 81, which, in turn, actuates a contactor actuator relay 82 and a sensor switch-over relay 83. A green LED 84 is also coupled to the collector of the transistor 81 and lights to indicate good three-phase power. A protective diode 85 provides a discharge path for the inductances of the relays 82 and 83. The relay 83 is not used if multiple integrity detectors are employed, as described later.

Figure 3:
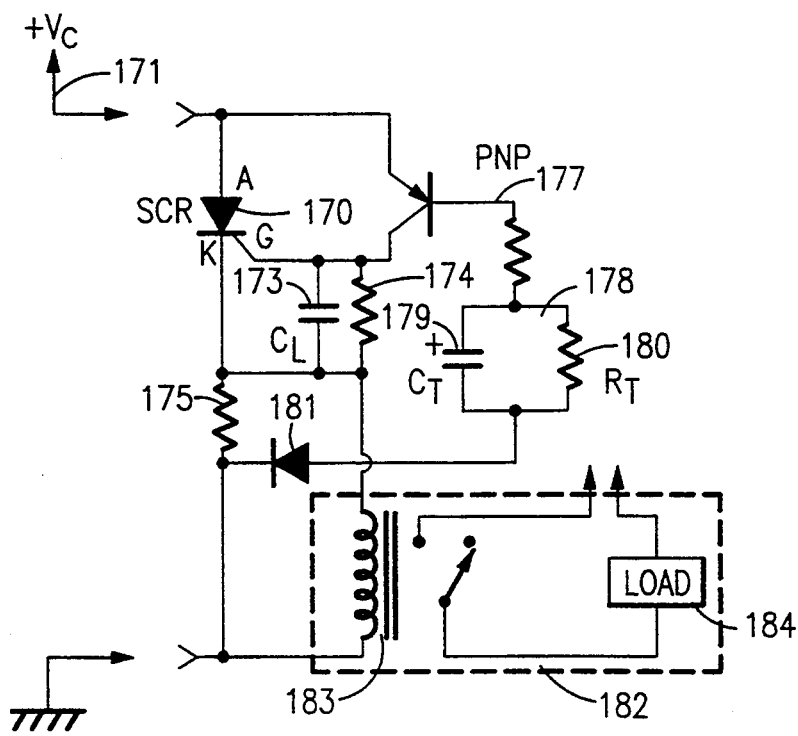
FIG. 3 shows a protective time delay circuit which forms a portion of a preferred embodiment.

The anti-short cycle timer circuit can be explained in simplest terms in reference to FIG. 3. As shown here, a silicon controlled rectifier 170 is disposed between a source 171 of dc voltage $V_c$ and ground. A filter capacitor and resistor are each connected between the gate and cathode of the SCR 170. An output resistor 175 is connected between the cathode of the SCR and ground. The PNP transistor 177 has its emitter coupled to the anode of the SCR 170 and its collector connected to the gate thereof. A time delay circuit is formed of a timing capacitor 179 and timing resistor 180 disposed in parallel, with a diode 181 coupled between the time delay circuit 178 and ground.

A load device 182 is disposed in parallel with the output resistor 175. In this case, the load device includes an actuator relay 183 which serves to energize the secondary load 184. In principle, this circuit is similar to the single-phase ac anti-short-cycle timer circuit that is described in my earlier U.S. Pat. No. 4,991,049, granted Feb. 5, 1991.

The time constant for the time delay circuit can be set to any suitable value as desired for any particular application. In many cases, a sixty second delay time is appropriate. In other cases this can be ten second up to one hour.

Figure 2B:
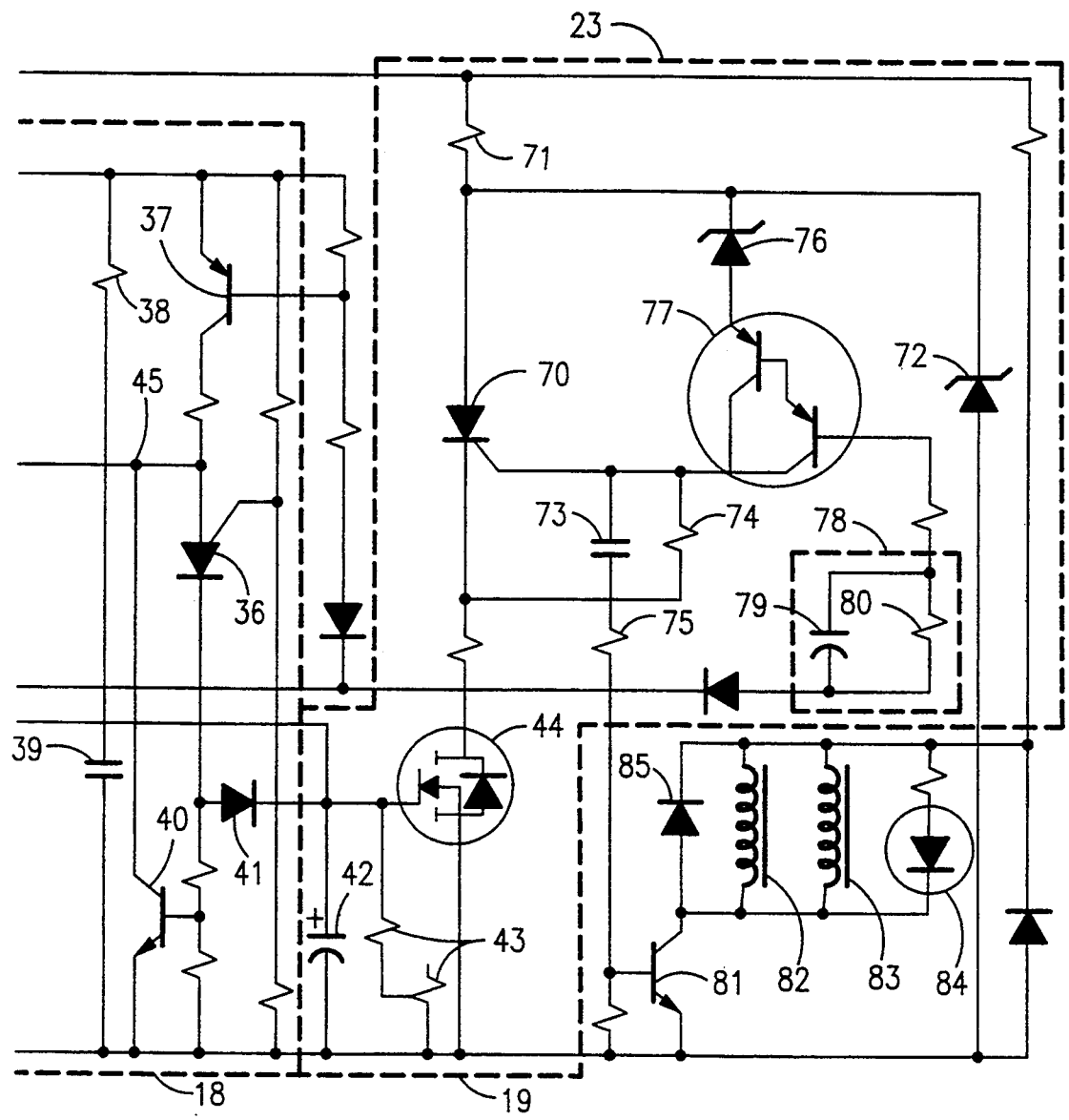
Figure 4:
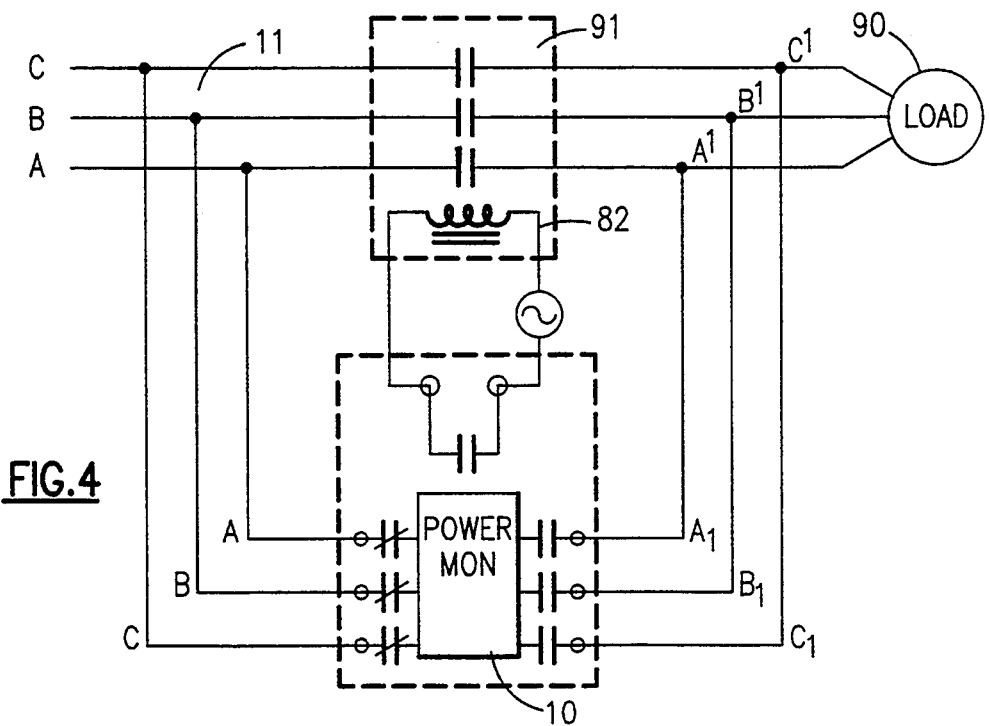
FIGS. 4, 5, and 6 are general schematic views showing implementations of this invention in voltage sensing, current sensing, and impedance sensing modes.

One possible implementation of the three phase power monitor circuit 10 of this invention is shown schematically in FIG. 4. Here, a contactor 91 is interposed in line between the three-phase power line 11 and a three-phase load 90. Initially, with the contactor 91 open, the phase integrity detector 12 and the three-phase rectifier circuit 14 (see FIG. 2A) are coupled upstream of the contactor 91. When the load is to be actuated, and if the three-phase power monitor does not detect a phase imbalance, while at the same time the voltage detector indicates that the line voltage is between the high and low voltage limits, the contactor or power actuator will close. At that same time, sensor switch-over relay 83 See FIG. 2B will close. This applies power through the contactor 91 or equivalent device to the load 90 and, at the same time, switches over the three-phase monitor to respective circuit points A' B' and C' between the contactor 91 and the load. Thus, in this configuration, if there is any phase problem which may occur because of a fault in the contactor 91 itself, the monitor circuit will respond to the fault and open the contactor 91 as appropriate.

Figure 5:
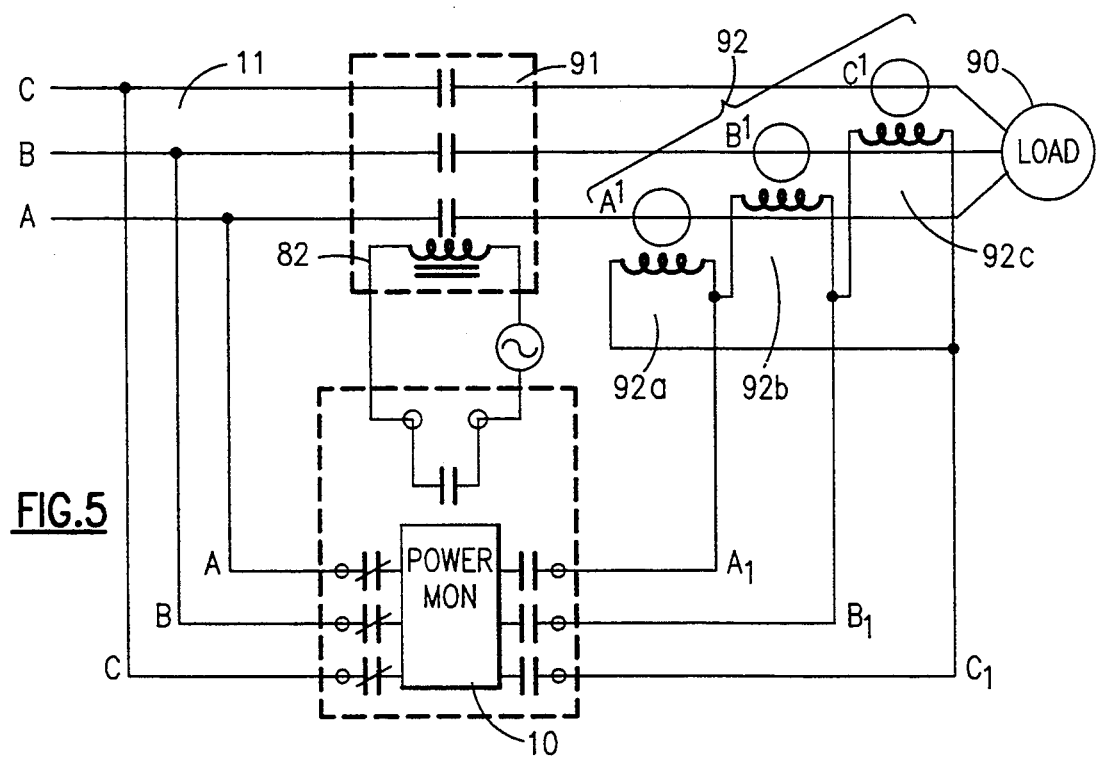

Another possible implementation of this invention is shown in FIG. 5, in which elements identical with those of FIG. 4 employ the same reference numbers. Here, after contactor closure, the three-phase power monitor circuit 10 is coupled to current sensors 92a, 92b, and 92c, which respectively indicate the current load being applied along each conductor of the three-phase power between the contactor 91 and the load 90.

Figure 6:
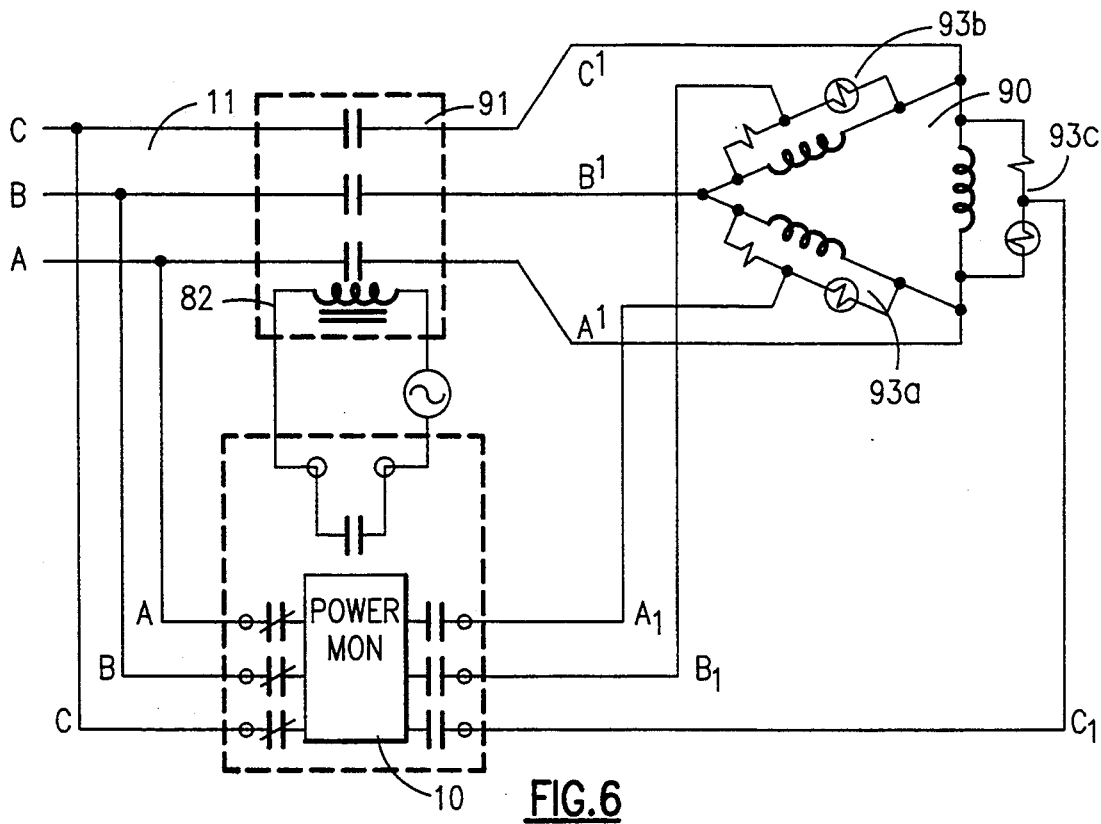

FIG. 6 shows another implementation, in which the same reference numbers as used earlier indicate the same elements. Here, after the contactor 91 has closed, impedance bridges 93a, 93b, and 93c couple respectively to three load phases, which can be three windings of a three-phase ac motor. These supply the three-phase voltage to the monitor circuit 10. A similar design, incorporating thermistors, can detect load temperature fluctuations in the three-phase load.

Figures 7, 7A:
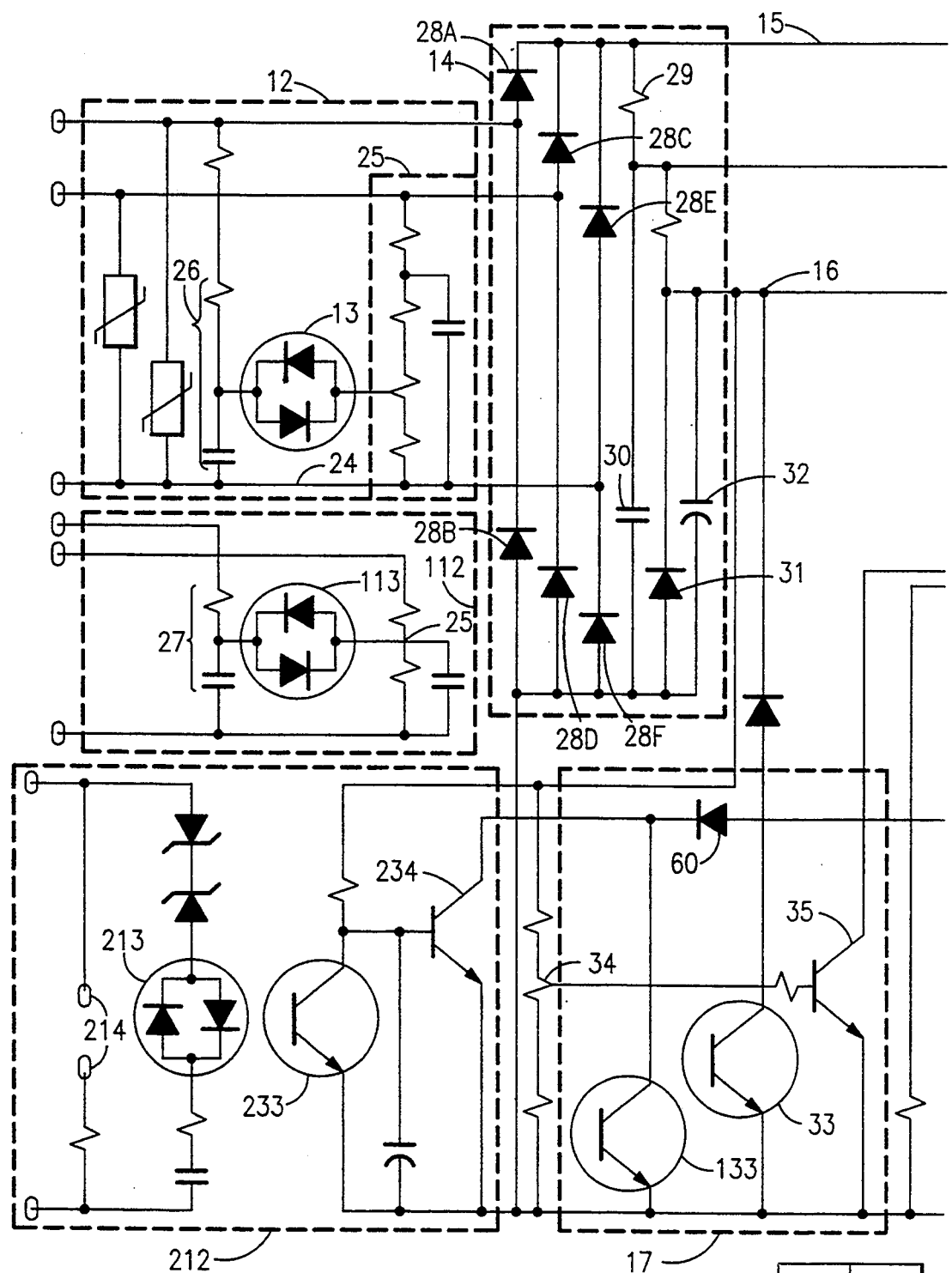
FIG. 7, formed of FIGS. 7A and 7B, is a schematic diagram of another power monitor according to another possible embodiment of this invention.
Figure 7B:
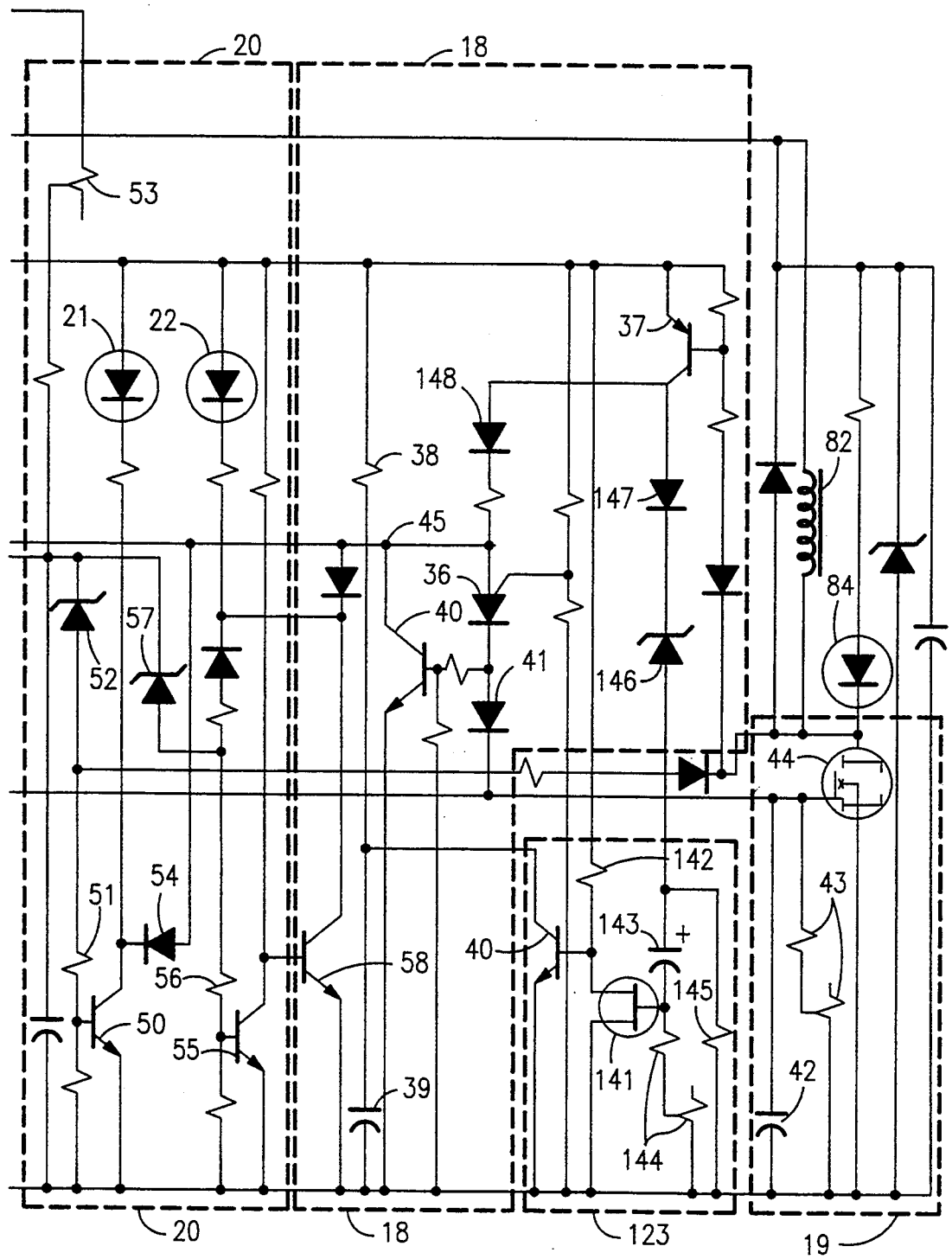

FIG. 7 shows a further embodiment of this invention, in which elements that are also illustrated in FIG. 2 are identified with the same reference numbers, and will be discussed in detail only as to differences from the circuit previously described.

As shown here, in addition to the previously described phase integrity detector 12 there is also provided an additional phase integrity detector 112 of similar design but coupled to three-phase conductors or legs, A', B', C' downstream of the contactor or other line device. This permits monitoring phase integrity of the supply power ahead of the device and the load, without need to switch between front side and back side of the contactor or other line device. Each integrity detector 12,112, has its respective hi-directional LED arrangement 13,113' which lights if there is a phase problem in the power ahead of the contactor or downstream of it. In the discharge circuit 17 of this embodiment there is a corresponding pair of phototransistors 33 and 133 connected in parallel and joined to the emitter of transistor 35. The two LED arrangements can both be optically coupled to the single phototransistor 33. However, the pair of phototransistors 33, 133 are shown here because it is convenient to use optocouplers in which the LEDs and phototransistors are packaged together.

Figure 8:
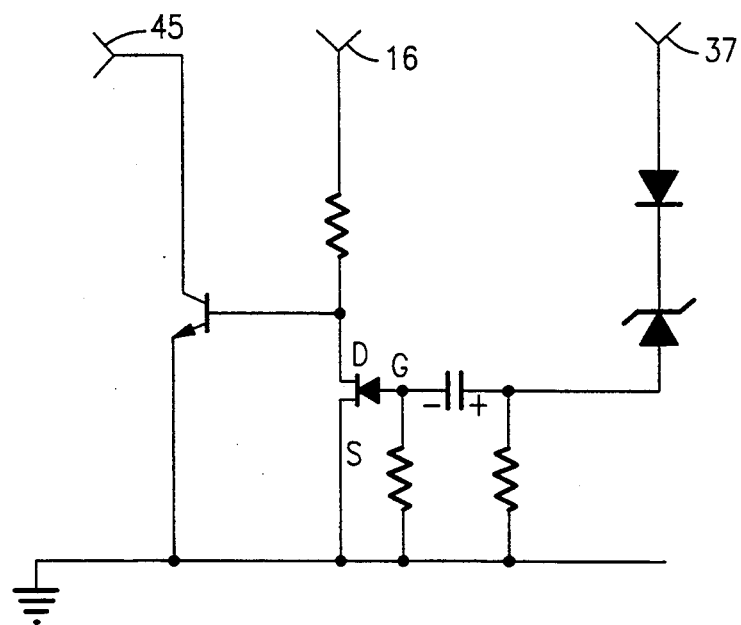
FIG. 8 is an enlargement showing detail of a portion of the embodiment of FIG. 7.

A control circuit 212 for switching ON the controller or line device can be arranged as shown in FIG. 7. Here the control circuit 212 has a bidirectional LED arrangement 213 that is ac coupled to a pair of control voltage inputs 214. An ac control voltage of 19 to 270 volts ac is applied across these inputs 214 to commence operation of the load device. This turns the LED arrangement 213 on, which emits light to actuate a corresponding phototransistor 233 that is coupled between ground and the source 16 of controlled dc low voltage. The transistor 233 is coupled to the base of an NPN transistor 234 whose emitter is grounded and whose collector is coupled to a point X that is also associated with the collectors of the phototransistors 33 and 133. A filter capacitor bridges the base and emitter of the transistor 234. If the phototransistor 233 is off, the transistor 234 is biased on. This prevents the transistor 44 from conducting. If the control voltage is applied to the circuit 212, the LED arrangement 213 emits, so that the phototransistor 233 conducts, which biases the transistor 234 off. This permits the interrogator circuit 18 to function, so that the contactor or other line device can function to operate the load device Also shown as a portion of the interrogator circuit 18 is a special anti-short-cycle timer circuit 123, here situated between the transistor 40, the transistor 37, the junction point 45 between the interrogator circuit capacitor 39 and resistor 38, and ground. The view of this circuit is enlarged in FIG. 8.

At the heart of this circuit 123 is an N-channel depletion type JFET 141 whose source is grounded, and whose drain is connected to the base of the transistor 40 and through a load resistor 142 to the source 16 of controlled dc voltage. The gate of the transistor 141 is connected to a negative side of a polarized timing capacitor 143, and through a bias resistor 144 to ground. The positive side of the capacitor 143 is connected through a resistance 145 to ground, and is also coupled through a zener diode 146 and through another diode 147 to the collector of transistor 37. A diode bias circuit 148 connects the diode 147 to the junction point 45.

The transistor 141 will conduct only if the gate potential is more positive than the source potential. The JFET 141 conducts to turn off the transistor 40. Thus, if the circuit 12 has recently applied current to the load, there will be a negative potential on the gate of the JFET 141 and transistor 40 will conduct, thereby inhibiting application of power to the load until the capacitor charge has decayed through resistor 144. The decay time can be adjustable by use of a variable resistance in series with resistor 144.

Other arrangements of the anti-short-cycle or lockout timer are possible.

The first integrity detector circuit 12 can monitor input power at a specified frequency, for example 60 Hz, whereas the second detector circuit 112 can monitor the three-phase power delivered to the load at a completely different frequency, and/or monitor over a given frequency range. This may require additional phase shifting for the phases A and B and an additional capacitor in series with the resistors of the biasing network 25. The additional capacitor gives the integrity circuit a degree of frequency independence.

A power monitor can be designed according to the main principles of the invention to include a large number of phase integrity detector circuits, for example, for five or more phases of power as is employed in certain high precision motors.

While this invention has been described in detail with respect to a preferred embodiment, it should be understood that this invention is not limited to that precise embodiment. Rather, many modification and variations would present themselves to those skilled in the art without departing from the scope and spirit of this invention, as defined in the appended claims.

What is claimed is:

1. Three-phase power monitor foe operating a line power device between a supply of three-phase electrical power and a three-phase load, comprising:
    a three-phase integrity detector circuit having three inputs connected respectively to the three phases of the electrical power supply for detecting a loss, reversal, or dissymmetry as among the three phases and actuating a photoemitting device upon detection of a loss, reversal, or significant dissymmetry in any one said phase;
    power supply means with inputs coupled to said supply of three phase power and an output providing a voltage level corresponding to the voltage level of said three phase electrical power;
    a hold circuit having an input terminal and an output terminal and a first time constant circuit associated with said input terminal and having a first predetermined time period, said output terminal attaining a hold level when current is applied to said input, and reverting to a release level said first predetermined time period after cessation of said current to said input terminal;
    an interrogator circuit coupled to said power supply output and to the input of said hold circuit means, the interrogator circuit being operative to apply periodic recharge current to the input of said hold circuit at a second period shorter than said first period, said power supply output being coupled to actuate and release said line power device;
    a high/low voltage level detector coupled to the output of said power supply means and having an output coupled to said interrogator circuit for interrupting said periodic recharge current if said power supply means output level is above a predetermined high level or below a predetermined low level; and
    a photosensor-based discharge circuit optically coupled to said photoemitting device of said three-phase integrity detector circuit and electrically coupled to said hold circuit for discharging said first time constant circuit to immediately set said hold circuit to its release level when said photoemitting means is actuated strongly.

2. The three-phase power monitor of claim 1 wherein said integrity detector circuit includes a first terminal coupled to a first phase, a second terminal coupled to a second phase and a third terminal coupled to a third phase of said three phase power, phase shift means coupled between said first and third terminals and providing at a first output a signal representing said first phase but phase shifted by a predetermined phase factor, circuit means coupled between said second and third terminals and having a second output providing a signal based on the second and third phases, and a pair of LEDs arranged back to back and connected between said first and second outputs, the LEDs being operative to light in the event of a loss, reversal, or dissymmetry in any of said first, second and third phases.

3. The three-phase power monitor of claim 1 wherein sail power supply means includes a three-phase diode bridge having three input terminals and first and second dc output terminals, said dc level appearing at said first output terminal, and a regulated supply circuit coupled between the first and second dc output terminals and providing a regulated dc low voltage.

4. The three-phase power monitor of claim 1 wherein said interrogator circuit comprises an RC timing circuit comprising resistor coupled to a source of dc voltage, a capacitor between said resistor and ground, and a transistor device having an anode coupled to a junction of said resistor and capacitor, a cathode coupled through an output resistance to ground and a gate coupled to a reference voltage between said output level and ground, with a junction of the cathode and said output resistance serving to supply said periodic recharge current to said hold circuit.

5. The three-phase power monitor of claim 4 wherein said interrogator circuit further includes unlatching circuit means coupled between the anode of the transistor device and ground to bypass said transistor device after said anode voltage has exceeded the gate voltage.

6. The three-phase power monitor of claim 4 wherein said high/low voltage detector means includes a high voltage sensing transistor having an output electrode coupled to said capacitor and a control electrode, and biasing means coupled to said control electrode and to said output level to turn said high voltage switch transistor on if said output level exceeds a predetermined maximum voltage, and thus discharging said capacitor.

7. The three-phase power monitor of claim 4 wherein said high/low voltage detector means includes a low voltage sensing transistor having an output electrode coupled to said capacitor and a control electrode, and biasing means coupled to the control electrode and to said output level to turn said low voltage switch transistor on if said output level drops below a predetermined minimum voltage, and thus discharging said capacitor.

8. The three-phase power monitor of claim 4, wherein said discharge circuit includes a photoconductor in series with a series resistor between a source of regulated dc voltage and ground and with an output terminal coupled to the input terminal of said hold circuit, the photoconductor being optically coupled to said photoemitting device of said three-phase integrity detector circuit, and which is actuated in response to a loss, reversal or dissymmetry of phase, and said photoconductor being operative under such condition to discharge said hold circuit to revert the latter to its release level.

9. The three-phase power monitor of claim 8 further comprising a transistor having a control electrode coupled to a junction of the photoconductor and the series resistor and two current-carrying electrodes, one coupled to ground and the other coupled to the junction of the capacitor and resistor of said interrogator circuit to inhibit said periodic discharge current in the event of a phase loss, reversal, or dissymmetry.

10. The three-phase power monitor of claim 1 comprising a relay control circuit following said hold circuit to actuate said line power device when said hold circuit attains said hold level and to release said line power device when said hold circuit reverts to said release level.

11. The three-phase power monitor of claim 10 wherein said relay control circuit includes a first relay to actuate said line power device to couple said three phase power to said load and a second relay which in an unactuated condition couples the three inputs of said integrity detector circuit to points between said supply and said device, and in an actuated condition couples said three inputs to points between said device and said load.

12. The three-phase power monitor of claim 10 further comprising protective anti-short-cycle time-delay circuit means interposed between said hold circuit and said relay control circuit, which delays energization of the relay control circuit when the hold circuit output terminal level rises to said hold level until a predetermined time period has elapsed following a previous reversion at said hold circuit output terminal to said release level.

13. The three-phase power monitor of claim 12 wherein said protective anti-short-cycle time-delay circuit includes an SCR having an anode connected to a dc source powered by said power supply means, a cathode coupled to the output terminal of said hold circuit, and a gate electrode; a transistor device having a base, an emitter coupled to said dc source, and a collector coupled to said gate; a filter capacitor coupled between the gate and cathode of said SCR; and a capacitive timing circuit coupled between the base of the transistor device and the output terminal of said hold circuit; and wherein said relay control circuit has an input coupled to the cathode of said SCR.

14. The three-phase power monitor according to claim 13 wherein said capacitive timing circuit includes a timing capacitor and a timing resistor connected in parallel between the base of the transistor device and said hold circuit output terminal.

15. The three-phase power monitor according to claim 14 wherein said timing capacitor and said timing resistor have a time constant on the order of ten seconds to ten minutes.

16. The three-phase power monitor according to claim 13 further including a protective diode disposed between said capacitive timing circuit and said hold circuit output terminal.

17. The three-phase power monitor according to claim 1 further comprising protective anti-short-cycle time-delay means disposed within said interrogator circuit to inhibit generation of said periodic recharge current until a predetermined time delay subsequent to a return of said hold circuit to its release level.

18. The three-phase power monitor according to claim 1 further comprising a second three-phase integrity detector circuit having inputs connected to the three phases of electrical power at circuit points different from those of the inputs of the first-mentioned integrity detector circuit and actuating a second photoemitting device upon a loss, reversal, or significant dissymmetary in any of one said phase; said discharge circuit means including means optically coupled to said second photoemitting device for discharging said first time constant circuit to immediately discharge said first time constant circuit when said second photoemitting device is emitting.

19. The three-phase power monitor according to claim 18 wherein said second three-phase integrity detector circuit inputs are coupled to respective devices to measure a parameter other than voltage and which convert the respective parameter to a voltage.

20. Multi-phase power monitor for operating a line power device between a supply of multiple-phase electrical power and a three-phase load, comprising:
a multiple-phase integrity detector circuit having at least three inputs connected respectively to at least three phases of the electrical power supply for detecting a loss, reversal, or dissymmetry as among the multiple phases and actuating a photoemitting device upon detection of a loss, reversal, or significant dissymmetry in any one of said phase;

power supply means with inputs coupled to said supply of multiple phase power and a power supply output providing a voltage level corresponding to the voltage level of said electrical power;

a hold circuit having an input terminal and an output terminal and a first time constant circuit associated with said input terminal and having a first predetermined time period, said output terminal attaining a hold level when current is applied to said input, and reverting to a release level said first predetermined time period after cessation of said current to said input terminal;

an interrogator circuit coupled to said power supply output and to the input terminal of said hold circuit means, the interrogator circuit being operative to apply periodic recharge current to the input of said hold circuit at a second period shorter than said first period, said input terminal being coupled to actuate and release said line power device;

a high/low voltage level detector coupled to the output of said power supply means and having an output coupled to said interrogator circuit for interrupting said periodic recharge current if said power supply means output level is above a predetermined high level or below a predetermined low level; and a photosensor-based discharge circuit optically coupled to said photoemitting device of said multiple-phase integrity detector circuit and electrically coupled to said hold circuit for discharging said first time constant circuit to immediately set said hold circuit to its release level when said photoemitting means is actuated strongly.

* * * * *